United States Patent [19]
Yoshida

[11] Patent Number: 5,148,339
[45] Date of Patent: Sep. 15, 1992

[54] MAGNETIC DISK STORAGE

[75] Inventor: Kobun Yoshida, Sayama, Japan

[73] Assignee: Teac Corporation, Tokyo, Japan

[21] Appl. No.: 612,414

[22] Filed: Nov. 13, 1990

[30] Foreign Application Priority Data

Nov. 13, 1989 [JP] Japan .................................. 1-294302

[51] Int. Cl.[5] .............................................. G11B 5/54
[52] U.S. Cl. ...................................... 360/105; 360/109
[58] Field of Search ................................ 360/105, 109

[56] References Cited

U.S. PATENT DOCUMENTS 4,933,785 6/1990 Morehouse et al. ............. 360/105 X
5,034,837 7/1991 Schmitz .................................. 360/105

FOREIGN PATENT DOCUMENTS 90-09660 8/1990 World Int. Prop. O. .......... 360/105

Primary Examiner—John H. Wolff
Attorney, Agent, or Firm—Michael N. Meller

[57] ABSTRACT

A magnetic disk storage apparatus has a head holding member which holds a magnetic head at a predetermined position apart from a magnetic disk after recording or reproducing in order to prevent either or both from getting damage. Since the location of the head holding member can be adjusted by the position adjusting mechanism, the head holding member never shade any recordable region of the magnetic disk and the magnetic head and the magnetic disk never come into contact with each other. Therefore the head holding member is always located at an appropriate position.

8 Claims, 5 Drawing Sheets

MAGNETIC DISK STORAGE

BACKGROUND OF THE INVENTION

The present invention relates generally to magnetic disk storages and more particularly to a magnetic disk storage having a head holding member which holds a magnetic head at a predetermined position apart from a magnetic disk.

Among magnetic disk storages, hard disk storages have been used as memory means for computers. Hard disks have been more improved than so-called floppy disks in TPI (track per inch) and BPI (bit per inch) so that the hard disks can be recorded with high density. The hard disk is fixed in a sealed housing to prevent dust from the outside attaching itself thereto so that it can be recorded with high density. In such a hard disk storage, a magnetic head performs recording and reproducing while having no contact with the disk because of an air current which is caused by the rotating of the disk. However, after recording or reproducing, the rotating of the disk is stopped so that the head comes into contact with the disk, and either or both get damage. To overcome this problem, the following method has been proposed. That is, the head is moved to an unrecordable region on the disk or outside of the disk so as to be held by a head holding member so that the head does not come into contact with the disk. The head holding member, the disk and the head are assembled individually and attached to the disk storage respectively.

But the conventional magnetic disk storage, in which the head holding member holds the head outside of the disk, has the following disadvantages. The head holding member is screwed approximately at a predetermined position in advance so that it cannot be finely adjusted. Accordingly, the head holding member tends to cover parts if some of the tracks of the disk, so that it will not be possible to use some of the same or to be located apart from the disk further than is needed. Therefore, when the head is held over the tracks, information cannot be recorded there. On the other hand, when the head is held at a position apart from the disk further than is needed, the head tends to collide against an edge of the disk.

Moreover, the method where the head holding member holds the head at almost the center of the disk, which is an unrecordable region, cannot be applied to a magnetic disk storage comprising a disk cartridge and a driving device, which will be described later.

SUMMARY OF THE INVENTION

Accordingly, it is a general object of the present invention to provide a novel and useful disk storage in which the disadvantages described above are eliminated.

Another object of the present invention is to provide a magnetic disk storage having a head holding member for holding a head so that tracks of a disk will be covered as mentioned above, so that the head and the disk do not get damaged when the rotating of the disk is stopped.

The more specific object of the present invention is to provide a magnetic disk storage which comprises a magnetic disk, rotating means for rotating the magnetic disk, a magnetic head for recording information on the magnetic disk and reproducing information therefrom while the magnetic disk is being rotated by the rotating means, a head actuator, pivotably mounted on a base, for moving the magnetic head in a direction approximately radial to the magnetic disk, a head holding member, mounted on the base, having a head holding part which holds the magnetic head at a predetermined position apart from the magnetic disk before the rotating means stops rotating, a position adjusting mechanism for moving the head holding part in order to position the head holding part at the predetermined position, and a fixing mechanism for fixing the head holding part at the predetermined position after the position adjusting mechanism has positioned the head holding part at the predetermined position, the magnetic head not coming into any contact with the magnetic disk while the magnetic head is being moved to the predetermined position by the head actuator, and the head holding member in which the head holding part is fixed at the predetermined position by the fixing mechanism covering no recordable region on the magnetic disk.

According to the present invention, the head holding member is always located at a position by the position adjusting mechanism without covering the recordable region of the magnetic disk so that the magnetic head and the magnetic disk do not come into contact with each other.

Other objects and further features of the present invention will become apparent from the following detailed description when read in conjunction with the accompanying drawings.

DESCRIPTION OF PREFERRED EMBODIMENTS

Figure 1:
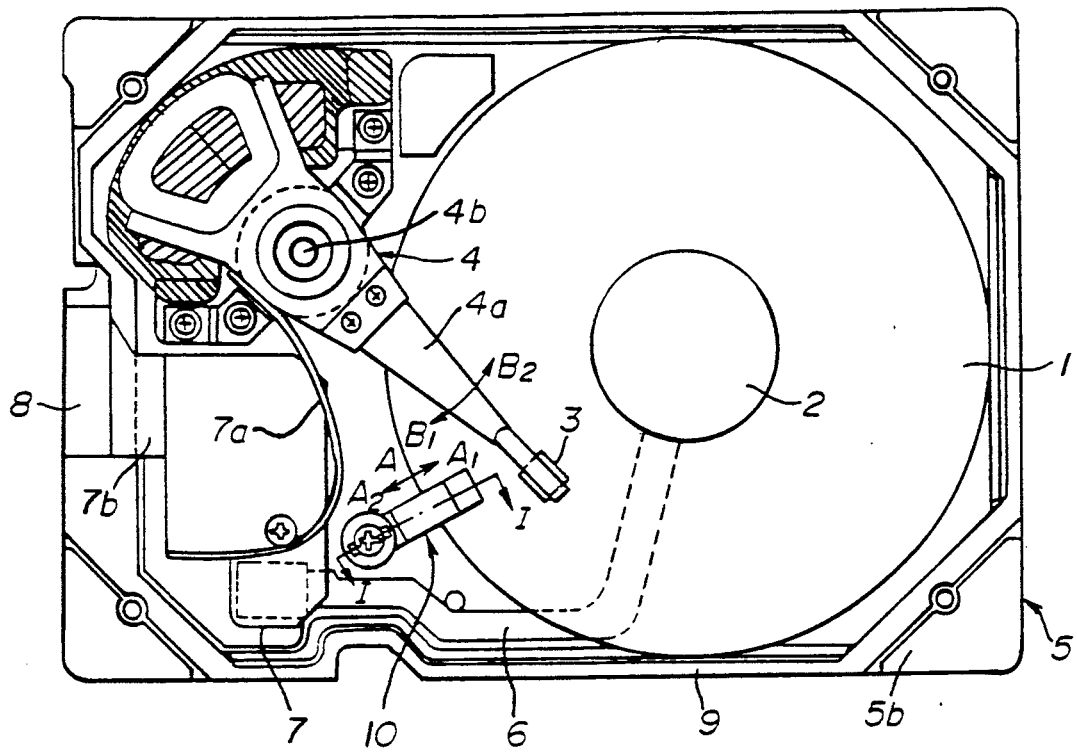
FIG. 1 is a plane view of a magnetic disk storage of a first embodiment according to the present invention.

A description will now be given of a first embodiment according to the present invention with reference to FIGS. 1 through 3.

A magnetic disk storage according to the embodiment is a hard disk storage, which comprises a magnetic disk 1, a spindle motor 2, magnetic heads 3, and a head actuator 4 in a case 5. As shown in FIG. 1, the magnetic disk 1 is rotated by the spindle motor 2 so that information is recorded thereon and reproduced therefrom by the heads 3. The actuator 4 has head arms 4a, and the heads 3 are mounted at the top thereof as they hold the disk 1, as shown in FIG. 2. The actuator 4 is a rotary type actuator, and is mounted pivotably around a shaft 4b on the lower case 5b. The heads 3 are moved in a direction approximately radial to a magnetic disk 1 (direction A). The motor 2 comprises a rotor and a .

housing. The disk 1 is fixed around the rotor. And a cord 6 is pulled out into the case 5 from the side of the housing so as to be connected with the flexible printed circuit board 7. The flexible printed circuit board 7 is connected with an external device via a connector 8. On the other hand, the flexible printed circuit board 7 and the actuator 4 are connected with each other via a wire 7a. Therefore the information recorded and/or reproduced by the head 3 and electricity to be supplied to a voice coil motor 13 for rotating the actuator 4 are supplied and/or transmitted to the actuator 4 via the connector 8, the flexible printed circuit board 7, and the wire 7a. The case 5 comprises an upper case 5a and a lower case 5b, and they are coupled together via an elastic member 9. The flexible printed circuit board 7 is held by the elastic member 9, the upper case 5a and the lower case 5b at a conjunction part 7b in which the flexible printed circuit board 7 is connected with the connector 8. Because of the elastic member 9, the case 5 is kept airtight. The flexible printed circuit board 7 is screwed to be fixed at the lower case 5b, as shown in FIG. 1.

The heads 3 are slightly floated away from the disk 1 by means of the air current generated by the rotating of the disk 1 during recording and reproducing. Therefore the hard disk storage according to this embodiment in which the heads 3 are required to be always kept apart from the disk 1 differs from Winchester disk storages using a contact start and stop method. Accordingly, the heads 3 are held by a head holding member 10 so as to be kept apart from the disk 1 before the rotating of the disk is stopped.

Figure 2:
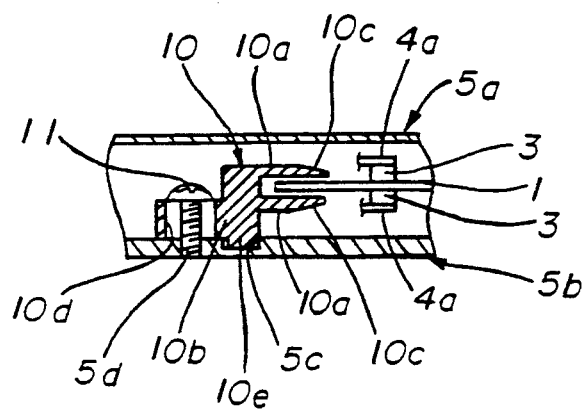
FIG. 2 is a cross-sectional view taken along line I—I shown in FIG. 1.
Figure 3:
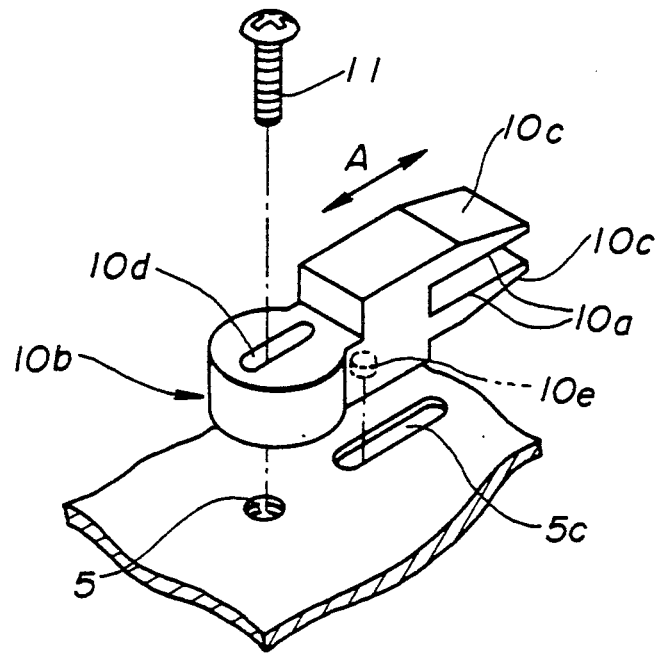
FIG. 3 is an essential perspective view of a head holding member.

The head holding member 10 comprises, as shown in FIG. 2 and FIG. 3, a pair of head holding parts 10a and a fixing part 10b. The head arm holding part 10a are parts for holding the heads 3, and the fixing parts 10b is a part for fixing the head holding member 10 at the lower case 5b. The head arm holding parts 10a are formed so as to hold the disk 1, and have inclined parts 10c at the top thereof, respectively. The angles of the inclined parts 10c are almost equal to each other and the head arm holding parts 10a are approximately parallel to the disk 1. When the head arms 4a touch the head holding member 10, the head arms 4a are lifted on the head arm holding parts 10a. The head arm holding parts 10a hold the head arms 4 by frictional forces. The head holding member 10 is made of polyacetal, for example. Thus, since the heads 3 are held apart from the disk 1 by the head holding member 10, they never collide with the disk 1 even when the rotating of the disk 1 is stopped, and even when the disk storage is being subjected to an external vibration.

Figure 4:
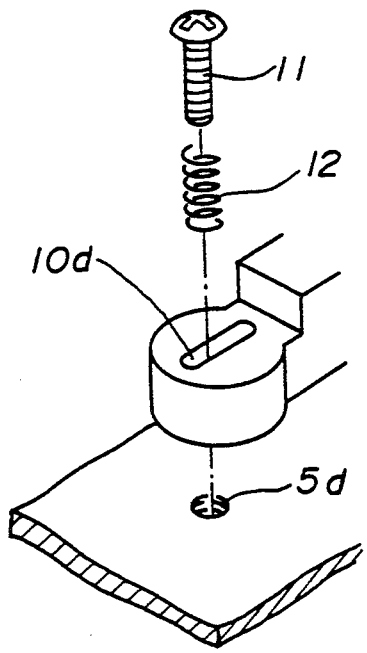
FIG. 4 is an essential perspective view of another head holding member different from that in FIG. 3.

The fixing part 10b has a slit 10d and a convex part 10e. The slit 10d extends in the above approximately radial direction (direction A). A screw 11 is inserted into the slit 10d to fix the head holding member 10. The screw 11 is engaged with a screw hole 5d mounted on the lower case 5b. The slit 10d extends in the direction A so that the head holding member 10 can be fixed even if it is moved to the direction A by means of the position adjustment which will be described later. The screw 11 may be inserted via a spring, as shown in FIG. 4, so that it is easier to move the head holding member 10.

The convex part 10e is mounted at the bottom of the head holding member 10, and engaged with a slit 5c extending in the direction A in the lower case 5b. The convex part 10e is engaged with the slit 5c so that the head holding member 10 is prevented from rotating. And the head holding member 10 is guided in the direction A because of the extending direction of the slit 5c. Thus, the head holding member 10 is position-adjusted in the direction A. The way of adjusting is determined by the position adjusting method described below.

A description will now be given of the position adjusting method of the head holding member 10. The position adjusting method is a method for determining a predetermined position where the head holding member 10 is to be located. Addresses are prerecorded on the recordable region of the disk 1. The head 3 can read the addresses on the disk 1, and a value of the address may be indicated on the display of an external device (not shown) via the connector 8. However the address does not have to correspond to the track of the disk 1. At first, the address of the most outer track of the disk 1 should be indicated. The address may be stored in an address register of RAM of the external device (not shown).

Next, the rotating of the disk 1 is stopped. Subsequently, the head holding member 10 is fixed at an arbitrary position by the screw 11. Then the heads 3 are moved from the disk 1 to the head holding parts 10a so as to be held by the head holding member 10. If the heads 3 come into contact with the disk 1 while the heads 3 is moved to the head holding parts 10a, it means that the head holding parts 10a are located apart from the disk 1 further than is needed. Therefore, in that case, the head holding member 10 is moved in the direction $A_1$ to get closer to the disk 1. On the other hand, if the heads 3 have not come into contact with the disk 1, the heads 3 are held by the head holding member 10. After the heads 3 are held, the disk 1 is rotated, then the heads 3 are moved onto the disk 1. An address which the heads 3 read first after they have moved onto the disk 1 is also indicated like the address of the most outer track. If these two addresses accord with each other, it means that the head holding parts 10a are located at the appropriate position. On the other hand, if the heads 3 read an address on the inside of the address of the most outer track, it means that the head holding parts 10a are located closer than is needed, so that the head holding member 10 covers tracks of the disk 1. Therefore, in this case, the head holding member 10 is moved to a direction $A_2$ to keep it apart from the disk 1, and the process continued until the two addresses accord with each other. The address information process discussed above comprises an indication system and a comparison system to control the position adjusting system.

Figure 5:
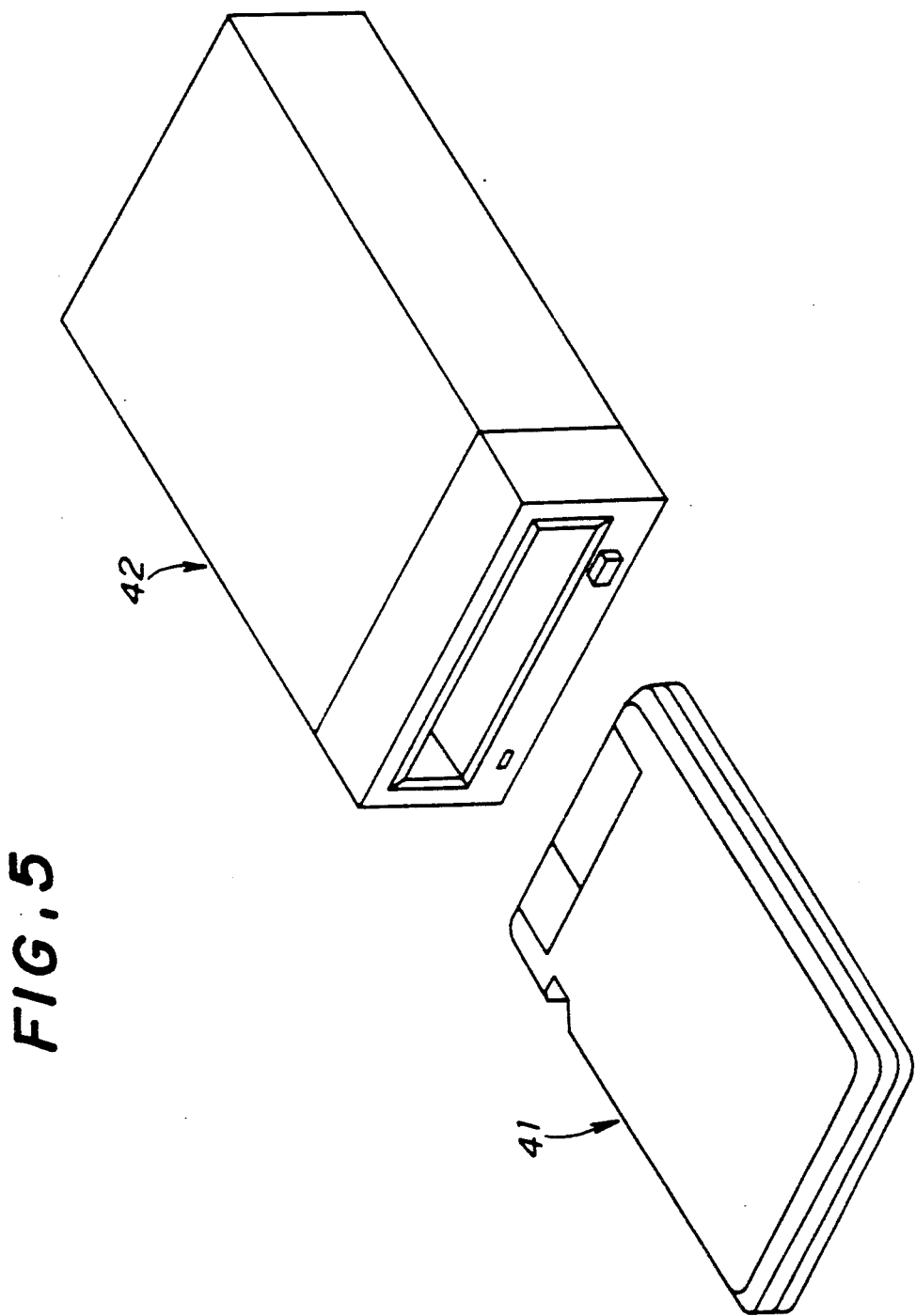
FIG. 5 is a perspective view of of a second embodiment of a magnetic disk storage according to the present invention.

FIG. 5 shows a magnetic disk storage comprising a disk cartridge 41 and a driving device 42. The term "a disk cartridge", as used herein, means an apparatus which comprises at least a disk and a head in a sealed case, but has no current supply source to drive them and has no controller to control them. The term "a driving device", as used herein, means an apparatus which has the current supply source and/or the controller. The disk cartridge 41 can be easily connected to and disconnected from the driving device 42. Therefore, the disk cartridge 41 may be considered as being an easily exchangable hard disk. The disk cartridge 41 has an arrangement similar to that shown in FIG. 1. Therefore, the disk cartridge 41 is subjected to the external vibration during carrying. As mentioned above, the head tends to come into contact with the disk during carrying if it is held at the center of the disk. Accordingly, the present invention is available for the magnetic disk storage having the disk cartridge 41 shown in FIG. 5.

Figure 6:
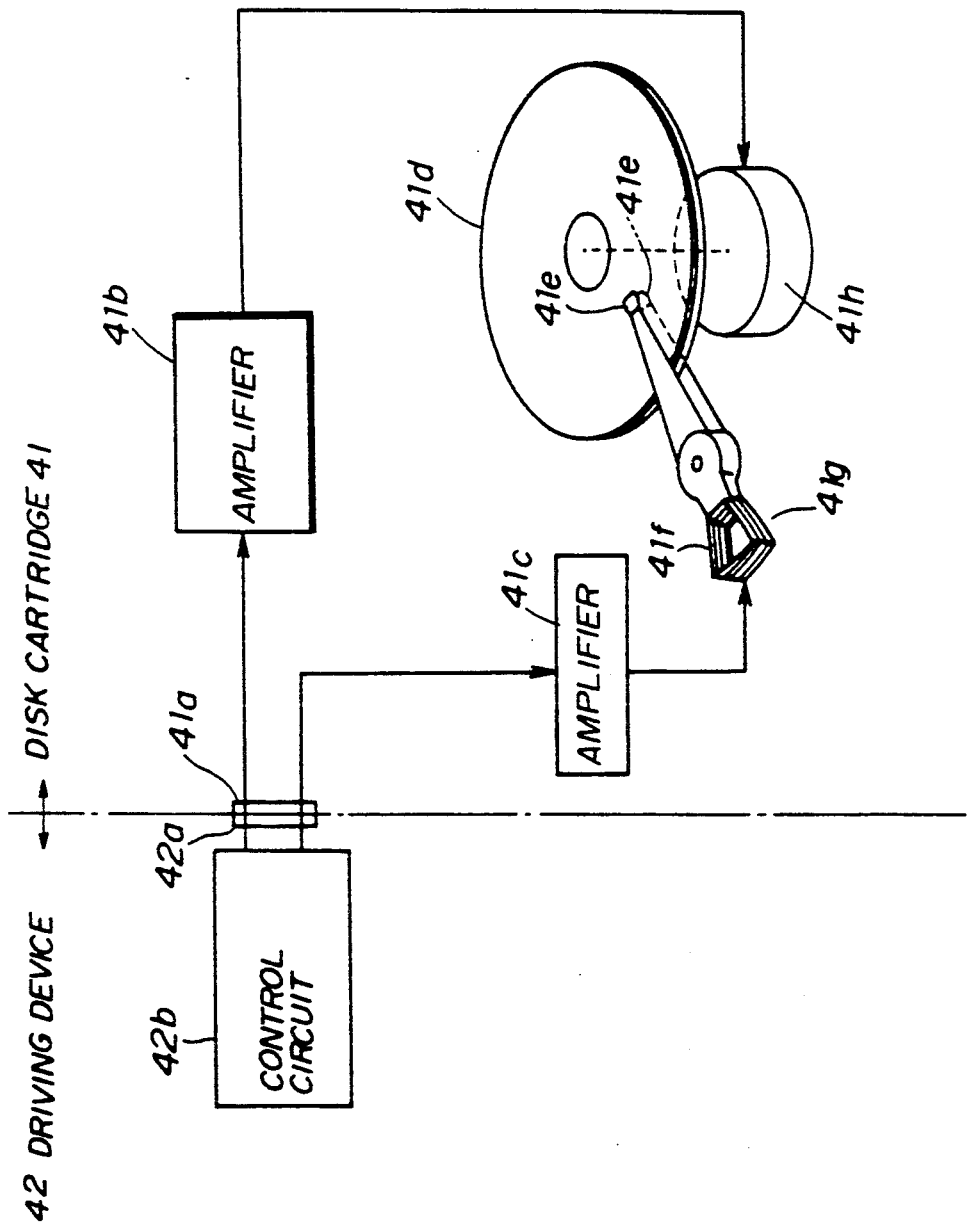
FIG. 6 is a system block diagram showing a general circuit arrangement which drives and controls an actuator and a spindle motor in a disk cartridge.
Figure 7:
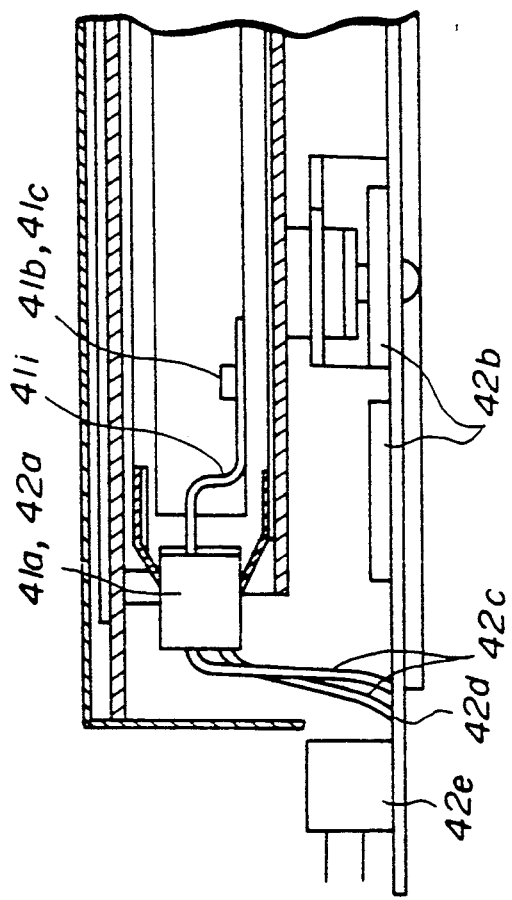
FIG. 7 is a cross-sectional view showing an electrical connection of connectors, a control circuit and amplifiers.

The disk cartridge 41 has a connector 41a which corresponds to the connector 8 in FIG. 1. On the other hand, the driving device 42 has a connector 42a to be connected with the connector 41a. The driving device 42 has a current supply source (not shown). The disk cartridge 41 further comprises a disk 41d corresponding to the disk 1 in FIG. 1, an actuator 41g corresponding to the actuator 4, magnetic heads 41e corresponding to the heads 3, a spindle motor 41h corresponding to the spindle motor 2. As shown in FIG. 6, when the connectors 41a and 42a are connected to each other, the control circuit 42b controls electricity for driving a driving coil 41f and the spindle motor 41h via amplifiers 41b and 41c. The amplifiers 41b and 41c are mounted on a flexible printed circuit board 41i corresponding to the flexible printed circuit board 7 in FIG. 1, and thus via the flexible printed circuit board 41i the amplifiers 41b and 41c are connected to the connector 41a. The amplifiers 41b and 41c may be made as IC boards so as to be mounted on the flexible printed circuit board 41i. The control circuit 42b may be further controlled by an external circuit. In this case, as shown FIG. 7, the driving device 42 has a connector 42e for connecting the driving device to the external device. The control circuit 42b is connected to the connector 42a via the printed circuit board 42d and lead wires 42c. Therefore when the disk cartridge 41 is connected to the driving device 42 via the connectors 41a and 42a, the amplifiers 41b and 41c are connected to the control circuit 42b. The control circuit 42b may be connected to the external device so as to be controlled via the printed circuit 42d and the connector 42e. The electricity, information recorded and/or reproduced, including address information by the head 41e, and control signals for controlling the driving of the driving device 41f and the spindle motor 41h are transmitted via the connectors 41a and 42a between the disk cartridge 41 and the driving device 42. The driving device 42 may control the driving of the driving coil 41f and the spindle motor 41h with or without the external device. Also the driving device may further comprise an information processor for processing the information recorded and/or reproduced by the head 41e.

The present invention can be applied, needless to say, to disk storage devices having holding members, such as optical disk storages, photomagnetic disk storages.

Further, the present invention is not limited to these preferred embodiments, but various variations and modifications may be made without departing from the scope of the present invention.

What is claimed is:

1. A magnetic disk storage apparatus comprising:
   a magnetic disk;
   rotating means for rotating said magnetic disk;
   a magnetic head for recording information on said magnetic disk and reproducing information therefrom while said magnetic disk is being rotated by said rotating means;
   a head actuator, pivotably mounted on a base, for moving said magnetic head mounted on a head arm in a direction approximately radial to said magnetic disk;
   a head arm holding member, mounted on said base, having a head arm holding part which holds said magnetic head arm with said magnetic head at a predetermined position apart from said magnetic disk before said rotating means stops rotating,
   a position adjusting mechanism for moving said head arm holding part in order to position said head arm holding part at said predetermined position; and
   a fixing mechanism for fixing said head holding arm part at said predetermined position after said position adjusting mechanism has positioned said head holding arm part at said predetermined position, said magnetic head not coming into any contact with said magnetic disk while said magnetic head is being moved to said predetermined position by said head actuator, and said head holding member, in which said head holding arm part is fixed at said predetermined position by said fixing mechanism, covering no recordable region on said magnetic disk, wherein said position adjusting mechanism comprises means for moving said head arm holding part in a direction approximately radial to said magnetic disk in order to position said head holding arm part as said predetermined position.

2. A magnetic disk storage according to claim 1, wherein said position adjusting mechanism further comprises a first groove extending in the direction approximately radial to said magnetic disk, and wherein said head holding member further comprises a convex part for engaging with the first groove so that said holding member can be moved in the direction approximately radial to said magnetic disk.

3. A magnetic disk storage according to claim 1, wherein:
   said base further comprises a screw hole;
   said fixing mechanism comprises a screw engageable with the screw hole; and
   said head holding member further comprises a second groove, extending in the direction approximately radial to said magnetic disk, into which the screw is to be inserted.

4. A magnetic disk storage according to claim 3, wherein said fixing mechanism further comprises a spring, the screw, which is inserted into the spring, being inserted into a second groove.

5. A magnetic disk storage according to claim 1, wherein information including addresses, which can be read by said magnetic head, are prerecorded on a recordable region of said magnetic disk, and
   wherein said magnetic disk storage further comprises an indicator for indicating an address read by said magnetic head, said position adjusting mechanism positioning the head holding part of said head holding member at the predetermined position so that, by using the indicator, a first address read by said magnetic head on the recordable region of said magnetic disk when said head actuator moves said magnetic head from the predetermined position to said magnetic disk after said magnetic head is released from being held by said head holding member can be in accordance with an address of a most outer part on the recordable region of said magnetic disk.

6. A magnetic disk storage according to claim 1, wherein said magnetic disk storage further comprises:
   a disk cartridge; and
   a driving device,
   wherein said disk cartridge comprises said magnetic disk, said rotating means, said head actuator, said head holding member, said position adjusting mechanism, and said fixing mechanism, and
   wherein said driving device has a current supply source which supplies electricity to said disk cartridge when said disk cartridge is connected with said driving device.

7. A magnetic disk storage according to claim 6, wherein said driving device has an information processor which receives and/or transmits the information.

8. A magnetic disk storage according to claim 7, wherein said driving device has a controller which controls the driving of the head and said disk.

* * * * *